United States Patent

[11] 3,593,429

[72] Inventor Stanley P. Thompson
 Box 7, St. Marys, Kans. 66536
[21] Appl. No. 847,270
[22] Filed Aug. 4, 1969
[45] Patented July 20, 1971

[54] METHOD OF DEHYDRATING A CROP
 8 Claims, 3 Drawing Figs.
[52] U.S. Cl. .................................................... 34/9, 34/12
[51] Int. Cl. ............................................................ F26b 3/00
[50] Field of Search ........................................... 34/9, 12; 263/32

[56] References Cited
UNITED STATES PATENTS

| | | | |
|---|---|---|---|
| 2,227,634 | 1/1941 | Dalin | 34/9 X |
| 2,472,794 | 6/1949 | Cothran | 34/9 X |
| 2,900,737 | 8/1959 | Heller | 34/12 |
| 3,396,476 | 8/1968 | Eaves | 263/32 X |

*Primary Examiner*—John J. Camby
*Attorney*—Don M. Bradley

ABSTRACT: This method of dehydrating a crop such as alfalfa or the like includes the step of spraying a coating of water on the crop just prior to advancement of the crop into the heated dehydrator drum.

PATENTED JUL20 1971 3,593,429

INVENTOR
STANLEY P. THOMPSON

BY Don M. Bradley

ATTORNEY

METHOD OF DEHYDRATING A CROP

This invention relates to the treatment of feed products, and more particularly, to the dehydrating of a crop such as alfalfa or the like. Crops of this kind are commonly passed longitudinally through a rotating dehydrator drum. While in the drum the crop is exposed to heated products of combustion emanating from a furnace in communication with the drum. These gases vaporize the moisture contained in the crop to produce a dried product which may be ground and pelleted and which is suitable, for example, for use as animal feed.

The temperatures to which the crop is exposed in the drum are substantially high. The crop is usually retained in the drum until sufficient evaporation of the moisture in the crop permits conveyance of the dried product by pneumatic or other means from the outlet end of the drum. The relatively high temperatures to which the crop is subjected do not, however, uniformly affect the various portions of the crop. For example, the leaves of crops such as alfalfa are dried by the hot products of combustion much more rapidly than are the more coarse stems of the alfalfa plant. The moisture in the stems is brought to the temperature for rapid evaporation only after dwelling in the heated environment a substantial period of time compared to the time necessary for drying the leaves.

Although the leaves and relatively small particles are usually conveyed through the drum at a faster rate, they still become charred or burned as a result of the time-temperature relationship encountered in the drum. This overheating or burning of the crop results in production of objectionable smoke which emanates from the dehydration plant. It also destroys much of the beneficial feed value of the crop, to say nothing of the objectionable taste imparted to the crop diminishing the palatability of the final product.

Relatively fine fibers or hairs on both the leaves and stems are quickly burned when the crop enters the dehydrator. Further, it is believed that beneficial crop constitutients such as xanthophyll and which contribute vitamin E and the like are damaged or destroyed by the elevation of the crop components to the point where burning or charring of the components begins. It is believed that a mold or the like on the surface of the crop may contribute to the presence of xanthophyll. This mold on the surface is quickly destroyed when the crop is dehydrated by conventional methods.

Accordingly, it is a primary object of this invention to provide a method for preventing the destruction by heat of the relatively vulnerable crop components while the relatively coarse components are heated to the requisite temperature for evaporating the moisture therefrom.

In carrying out the foregoing object, it is an important object of the present invention to coat substantially the entire outer surface of the crop before introducing the latter to the heated dehydration gases so that the evaporation of the moisture from the outer surface protects the underlying crop surface portions from the burning effects of the heat until the components are moved to relatively cooler regions in the dehydrator drum.

Another object of this invention is the protection of highly heat destructible components of the crop to prevent the loss of valuable nutrients and vitamins and other beneficial constituents of the crop while the same is subjected to the action of dehydration gases.

Another object of the invention is to provide a dehydration method wherein the gases emanating from the dehydrator are relatively free or even entirely free of smoke from charred or burned crop particles.

Still a further object of the invention is to provide a dehydrating process wherein relatively large quantities of steam are produced within the dehydrating drum which steam tends to transfer heat throughout the drum to enhance the overall efficiency of the dehydrating operation.

A yet further object of this invention is to provide a process wherein the benefits of using a cone-type furnace are obtained without any harmful effects occurring as a result of the relatively high temperatures at the inlet end of the dehydrator drum which are produced by furnaces of this type.

These and other important objects of this invention will be further explained or will become apparent from the following specification and claims and from the drawing.

Figure 2:
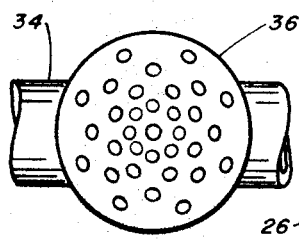
FIG. 2 is a bottom plan view of a sprayer head which may be utilized in carrying out this invention.
Figure 3:
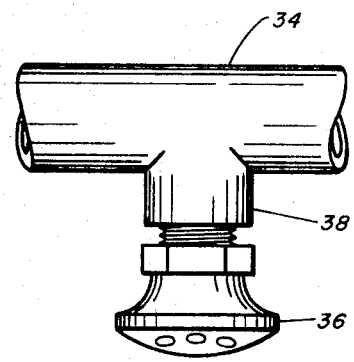
FIG. 3 is a detailed, vertical, cross-sectional view through a spray bar used in carrying out the method of this invention.

Apparatus for carrying out the method of this invention is broadly designated by the reference numeral 10 in the drawing and includes an elongated axially rotatable dehydration drum 12 which is in fluid communication at one end thereof with a cone-shaped furnace 14 provided with blower means 16 for directing air for sustaining combustion into the furnace 14. Material such as a crop in the nature of alfalfa or the like is fed to drum 12 from an unloading ramp broadly designated 18, through a slat-type conveyor 20 and a transversely extending auger conveyor 22. The latter communicates with the inlet end of drum 12 adjacent the discharge end of furnace 14 so that the crop emanating from conveyor 22 is subjected to the relatively hot gases produced by combustion in furnace 14.

A fan 24 may be placed in communication with the outlet end of drum 12 for pulling the hot products of combustion and the dehydrated crop material from drum 12. Manifestly, fan 24 is operated by motor 26 at a rate of speed calculated to remove the crop products from the dehydrator drum after the same have become sufficiently light through evaporation of the moisture content therefrom in the drum to permit entrainment in the fluid stream.

The dehydrated crop material may be conveyed pneumatically through a tube 28 to a cyclone-type separator 30. Here, in separator 30, the crop products are separated from the fluid stream whereupon the products may be pelletized or otherwise treated for rendering the products usable as an animal feed or the like. It will be understood, of course, that the dehydrated products could be subjected to the operation of a hammermill or the like following dehydration. Further, it should be understood that apparatus for crushing stems or like material could be interposed in apparatus 10 upstream from the inlet end of drum 12 to render the crop material more easily dehydrated when the material is placed in the hot gaseous environment within drum 12. The apparatus heretofore described is entirely conventional and, by itself, forms no part of the instant invention. According to the method of dehydrating pursuant to this invention, however, water is applied to the outer surface of the crop material prior to the passage of the material into the dehydrator drum. Any suitable apparatus may be employed for this purpose. The apparatus illustrated in the drawings for this purpose is broadly designated by the reference numeral 32 and includes an elongated tubular spray bar 34. Bar 34 extends across conveyor 18 and is provided with a plurality of downwardly directed nozzle heads 36 communicating with bar 34 through fittings 38 disposed at spaced intervals along bar 34 as shown in the drawing. Bar 34 is in fluid communication with a source of water (not shown) through pipe 40.

Manifestly, apparatus 32 could be disposed at any point upstream from the inlet end of drum 12. If stem-crushing apparatus (not shown) is to be utilized for breaking down the fibrous structure of the crop prior to dehydration of the latter, the station at which water is applied to the crop is preferably located downstream from such stem-crushing apparatus.

As the crop is advanced towards the inlet of the dehydrator drum, water is applied to the crop at a rate and in sufficient amounts for thoroughly coating the outer surface of the leaves and stems of the crop. It has been found empirically that beneficial results are to be obtained if water is applied to the crop in amounts ranging from 100 pounds of water per ton of dry material to approximately 1,500 pounds of water per ton of dry material. Apparently, amounts in excess of 1,500 pounds of water per ton of dry material do not produce beneficial results greater than that which may be achieved in applying water at approximately the 1,500 pound rate.

Figure 1:
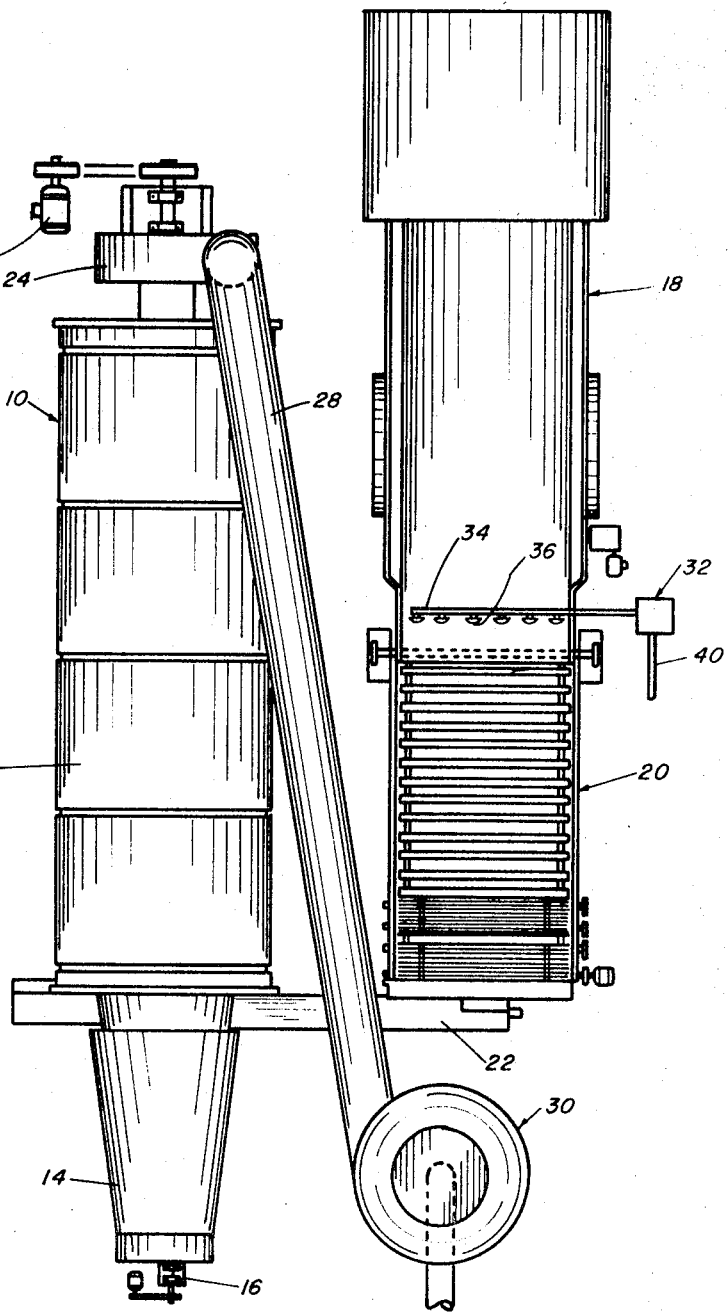
FIG. 1 is a top plan, partially diagrammatic view of a typical dehydrating plant capable of carrying out the method of this invention.

Following application of water to the crop for wetting the outer surface thereof, the crop is introduced into the heated gas environment in drum 12. Normally, the temperatures encountered by the crop in the drum range from approximately 2,500° F. to approximately 3,400° F. The temperatures at the outlet end of the drum range from approximately 200° F. to approximately 230° F. This presupposes a length of approximately 36 feet for drum 12 and the use of a cone-type burner as illustrated in FIG. 1.

The water on the outer surface of the components of the crop prevents the relatively easily destroyed constituents from burning. Actually, the cooling effect caused by the evaporation of the water from the surface of these easily destroyed constituents serves to protect the latter. This protection remains for a sufficient period of time to permit transfer of the material longitudinally of the drum toward the outlet end thereof. The evaporation of this protective water is not completed until the more vulnerable constituents of the crop have escaped the relatively high temperatures at the inlet end of the drum and have reached the cooler regions near the outlet.

The relatively light portions such as leaves and particulate material do not remain in the drum nearly as long as the relatively coarse stems. Further, the rate of transfer of the coarse material through the drum is somewhat slower. Accordingly, the relatively coarse materials are subjected to the high temperatures for a sufficient period of time to not only evaporate the water but to insure evaporation of the moisture from within the stems.

It is believed that the steam produced in the dehydrator drum as a result of the water coating for the crop aids in the transfer of heat longitudinally through the dehydrator drum. This produces a environment of heated gases which is more uniform throughout the length of the drum and this also helps to eliminate burning or charring of the surface and vulnerable portions of the crop during dehydration.

It is desirable that as much of the outer surface of each plant comprising the crop be coated with water as is possible. To this end, it has been found desirable to introduce quantities of a suitable wetting agent such as a detergent or the like into the water prior to applying the water to the crop. Obviously, the amount of agent required for any particular dehydration operation will vary depending upon the nature of the crop and whether the latter has a relatively waxy outer surface. The same may be said about the quantities of water introduced onto the crop prior to dehydration. In other words, the amounts required will vary depending upon the nature and relative dryness of the crop. It suffices to say that the water should be added in quantities sufficient for preventing the charring or burning of the crop as it passes through the environment of heated gases.

The product dehydrated pursuant to the method of this invention has been found particularly high in Vitamin E and Vitamin A content. It is theorized that the protection afforded by the water coating prevents destruction of the beneficial mold on the plants thought to be a source of xanthophyll. Also, the high Vitamin A and E content may be a result of the saving of the highly beneficial and easily destroyed leaves of the crop.

The product protected during dehydration by the application of a coating of water has been found to be more palatable because it is free of the objectionable tastes resulting from the charring of crop constituents. The water coating increases the production of steam in the drum but minimizes or completely eliminates the production of objectionable smoke by protecting from burning the relatively fine portions of the plants. The fibers and plant hairs which are exposed during a stem-crushing operation are extremely vulnerable to burning or charring in the dehydration process. These portions are also protected from burning or charring by the application of water thereto as contemplated in this invention.

Having thus described the invention, what I claim as new and desire to be secured by Letters Patent is:

1. A method of dehydrating a forage crop such as alfalfa or the like including relatively coarse and relatively fine constituents, said method comprising:

applying a controlled amount of water to the outer surface of the crop to wet said outer surface;

promptly thereafter introducing the crop to an environment of heated gases, said gases being at a temperature sufficiently high for removing moisture from within the crop constituents;

holding the crop in said environment for a time period sufficient for evaporating said water and substantially drying the crop throughout whereby evaporation of the applied water on the outer surface minimizes destruction of the relatively fine constituents; and removing the dried crop from said environment.

2. The method as set forth in claim 1, wherein said step of applying water to the crop includes the coating of substantially the entire outer surface of the crop with water.

3. The method as set forth in claim 1, wherein is included the step of advancing said crop toward said environment, the water being applied to the crop by spraying on the crop as the latter is advanced.

4. The method as set forth in claim 1, wherein said water is applied to the crop in amounts of from approximately 100 pounds of water per ton of dry material to approximately 1,500 pounds of water per ton of dry material.

5. The method as set forth in claim 1, wherein said crop is partially cured alfalfa hay, and wherein said water is applied at a rate of approximately 1,500 pounds of water per ton of hay.

6. The method as set forth in claim 1, wherein said crop is introduced into a rotating drum after the water is applied to the crop, said environment being in the drum, and wherein the temperature of the gases in said environment at the inlet end thereof is between approximately 2,500° F. to approximately 3,400° F. and the temperature at the outlet end of said drum is between approximately 200° F. to approximately 230° F.

7. The method as set forth in claim 3, wherein is included the step of adding a wetting agent to said water prior to spraying the water on the crop.

8. The method as set forth in claim 7, wherein said water and wetting agent are sprayed on the crop from above the latter while the crop is advanced therebeneath.